(12) United States Patent
Krishna et al.

(10) Patent No.: US 7,475,335 B2
(45) Date of Patent: Jan. 6, 2009

(54) METHOD FOR AUTOMATICALLY AND DYNAMICALLY COMPOSING DOCUMENT MANAGEMENT APPLICATIONS

(75) Inventors: Vikas Krishna, San Jose, CA (US); Savitha Srinivasan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 10/980,716

(22) Filed: Nov. 3, 2004

(65) Prior Publication Data

US 2006/0095830 A1    May 4, 2006

(51) Int. Cl.
*G06F 17/00* (2006.01)
(52) U.S. Cl. ................. 715/229; 715/255
(58) Field of Classification Search ............ 715/500, 715/513, 255, 230, 229
See application file for complete search history.

(56) References Cited

U.S. PATENT DOCUMENTS

| | | | | |
|---|---|---|---|---|
| 5,537,526 | A | | 7/1996 | Anderson et al. ............ 715/515 |
| 6,064,977 | A | * | 5/2000 | Haverstock et al. ............ 705/9 |
| 6,424,978 | B1 | | 7/2002 | Liu et al. ................. 715/501.1 |
| 7,039,860 | B1 | * | 5/2006 | Gautestad ................... 715/205 |
| 7,146,367 | B2 | * | 12/2006 | Shutt ............................. 707/9 |
| 2003/0200215 | A1 | | 10/2003 | Chen .............................. 707/9 |
| 2004/0019846 | A1 | * | 1/2004 | Castellani et al. ........... 715/500 |
| 2004/0111676 | A1 | | 6/2004 | Jang ............................. 715/513 |
| 2004/0133849 | A1 | | 7/2004 | Goger ......................... 715/500 |
| 2004/0267721 | A1 | * | 12/2004 | Meyerzon et al. .............. 707/3 |
| 2005/0080693 | A1 | * | 4/2005 | Foss et al. ..................... 705/30 |
| 2005/0289182 | A1 | * | 12/2005 | Pandian et al. ........... 707/104.1 |
| 2006/0112108 | A1 | * | 5/2006 | Eklund et al. ............... 707/100 |

OTHER PUBLICATIONS

Jackson & Turechek, Integrated Document Management System, IBM Technical Disclosure Bulletin, vol. 36, No. 06A, Jun. 1993, pp. 445-456.

* cited by examiner

*Primary Examiner*—Laurie Ries
(74) *Attorney, Agent, or Firm*—Samuel A. Kassatly; Jon A. Gibbons; Fleit Gibbons Gutman Bongini & Bianco P.L.

(57) ABSTRACT

A document management system applies relevant document analysis, metadata extraction, and business process association algorithms and methodology to automatically and dynamically classify documents for routing, processing, and executing customized business logic. The document management system accepts documents from one or more channels, classifies the document and extracts metadata, executes customized application profiles and triggers business logic associated with the process. The document management system comprises a rules engine to detect and classify unstructured forms as well as structured forms, where the locations of attributes and visual layout are not fixed. The document management system provides automatic linkage between disparate systems that manages documents for the complete execution of a business process.

7 Claims, 8 Drawing Sheets

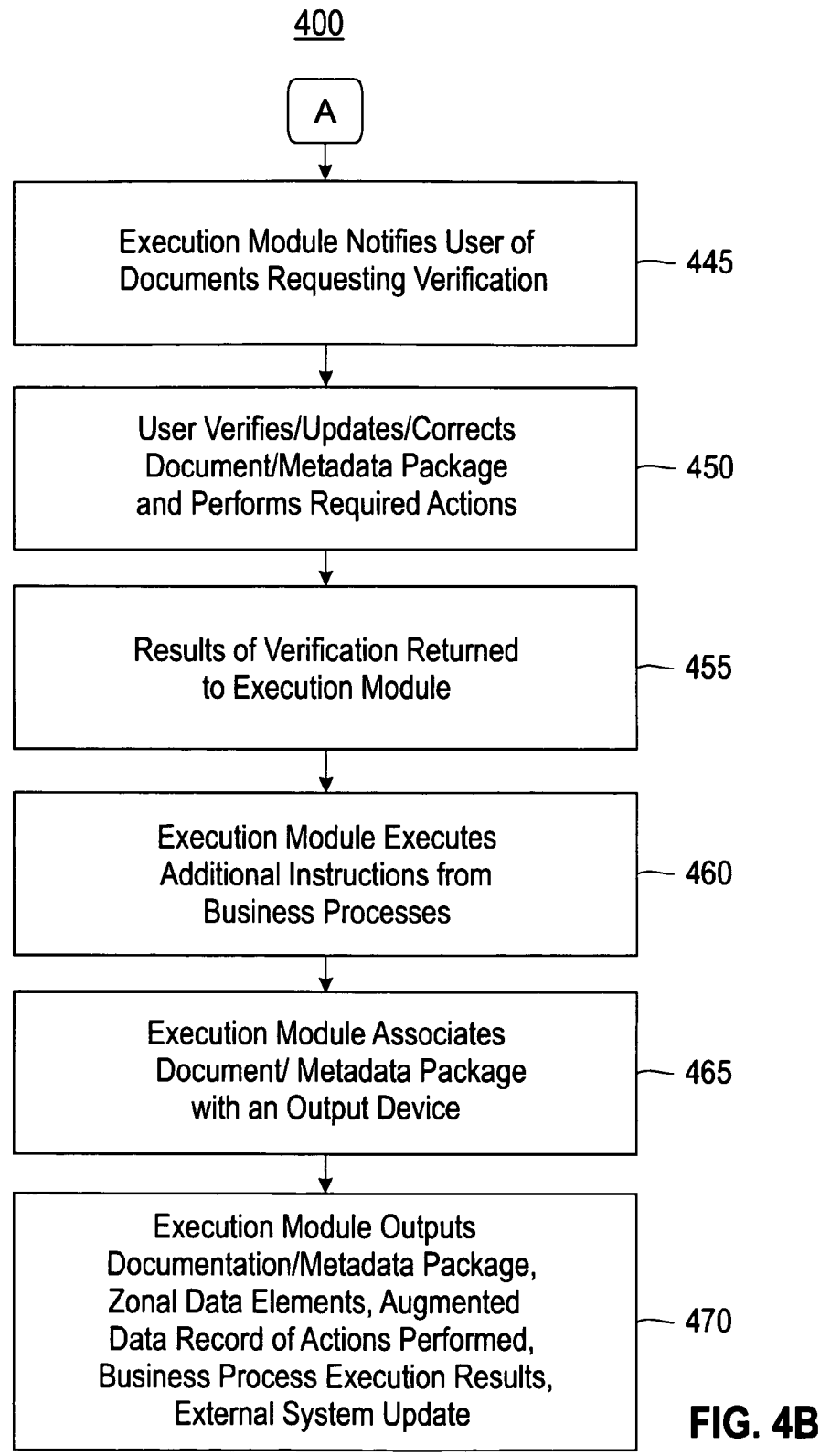

```
<?xml version="1.0" endcoding="UTF-8"?>
<BUSINESS_PROCESS NAME="US Imports">
<NODE ID="1">
    <NAME>Supplier</NAME>
    <CLASSIFICATION>
        <USAGE>On</USAGE>
        <VERIFICATION>On</VERIFICATION>
    </CLASSIFICATION>
    <ZONAL_OCR>
        <USAGE>on</USAGE>
        <VERIFICATION>On</VERIFICATION>
    </ZONAL_OCR>
    <NOTIFICATION>
        <USAGE>On</USAGE>
        <NOTIFICATION_INTERFACE>
            <INTERFACE>SMTP</INTERFACE>
            <MSERVER>mail.gig.com</MSERVER>
        </NOTIFICATION_INTERFACE>
        <NOTIFICATION_CONTACT>
            <FROM>supplier@giga-byte.com</FROM>
            <TO>contact1@panalpina.com</TO>
            <CC>contact2@panalpina.com</CC>
            <BCC/>
        </NOTIFICATION_CONTACT>
        <NOTIFICATION_TEXT>Panalpinapersonnel,\r\n\r\nGiga-Byte Technology Co., Ltd. has shipped a package of goods to Your Company through your shippping services.\r\n\r\nPlease click on this link to act on it. http://gatewayserver/CMFormsVerificationWeb/login.jsp\r\n\r--FormsRCM</NOTIFICATION_TEXT>
    </NOTIFICATION>
    <CM_SCHEMA_ITEM_TYPE>USImports_Invoice</CM_SCHEMA_ITEM_TYPE>
</NODE>
```

FIG. 5

METHOD FOR AUTOMATICALLY AND DYNAMICALLY COMPOSING DOCUMENT MANAGEMENT APPLICATIONS

FIELD OF THE INVENTION

The present invention generally relates to content management. More specifically, the present system pertains to a content management application that applies relevant document analysis, metadata extraction, and business process association algorithms and methodology to automatically and dynamically classify documents for routing, processing, and executing customized business logic.

BACKGROUND OF THE INVENTION

Content management is defined as software that builds, organizes, manages, and stores collections of digital works in any medium or format. Content management refers to the process of handling various types of structured and unstructured information, including images and documents that may contain billing data, customer service information, or other types of content. Content management further refers to the process of capturing, storing, sorting, codifying, integrating, updating and protecting any and all information. Studies estimate that more than 75% of enterprise data is unstructured and document-related (Lyman, Peter, et. al., "How Much Information, 2000", http://www.sims.berkeley.edu/how-much-info).

Key technologies in the content management market include document management, web content management, digital asset management, and records management. Typical users of content management are in document-heavy industries in which document management is essential, often for regulatory or compliance reasons. Content comprises many different forms of unstructured data requiring management: business documents, dynamic web content, records management, and rich media. Business documents comprise contracts, invoices, forms, and e-mail. Business documents, for example, facilitate internal back-office processes and enable direct external communication with customers, partners, and suppliers. Dynamic web content comprises business data in relational databases and personalized information. Records management is typically driven by government and industry regulations to effectively document the processes, audit trails, and data retention. Rich media comprises digital audio and video. Rich media is rapidly transforming areas of training, education, marketing and customer relationship management in many industries The notion of relating document management with workflow has been prevalent for several decades and many document management systems incorporate this feature. One conventional method presents tools and methods to address problems in integrated document and workflow management with a case study involving offer processing for a machine tool company (Morschheuser, S., et. al., "Integrated document and workflow management applied to the offer processing of a machine tool company", In Proceedings of Conference on Organizational Computing Systems, 1995). This conventional method is a process definition language designed to make a document-oriented tool with a workflow engine more efficient.

Another conventional approach utilizes an idea of using active document properties to extend document management applications (Dourish, P., et al., "Extending document management systems with user-specific active properties", In ACM Transactions on Information Systems (TOIS), Volume 18 Issue 2, 2000). This conventional approach avoids traditional hierarchical storage mechanisms, reflects document categorizations meaningful to user tasks, and provides a means to integrate the perspectives of one or more individuals within a uniform interaction framework. Property-based document management systems are augmented with the notion of active properties that carry executable code to enable the provision of document-based services on a property infrastructure.

Yet another conventional system captures essentially freely structured documents such as those typically used in the office domain (Mattos, N. M., et. al., "An approach to integrated office document processing and management", In ACM SIGOIS Bulletin, Proceedings of the Conference on Office Information Systems, Volume 11 Issue 2-3, 1990). This conventional system facilitates the handling of documents containing information. Analyzed documents are stored in a document management system that is connected to several different subsequent services and serves as rudimentary workflow.

FileNet presents a workflow engine in conjunction with the document technologies to automate production and ad hoc business processes respectively (Whelan, D, "FileNet integrated document management database usage and issues", In ACM SIGMOD Record, Proceedings of the 1998 ACM SIGMOD international conference on Management of data, Volume 27 Issue 2, 1998).

Most conventional document management systems are supported by a relational model. In terms of relevant relational modeling research, formal modeling of relational schemas originated with an emphasis on runtime aspects such as query expression (Andries M., et. al., "A hybrid query language for the extended entity relationship model", In Journal of Visual Languages and Computing, 8(1), 1997, Special Issue on Visual Query Systems; and Angelaccio, M., et. al., "QBD*: A Fully Visual Query System", Journal on Visual Languages and Computing, 1(2), 255-273, 1990), query result display, and navigation through the stored data. Collectively, these tasks are referred to as Visual Query Systems (VQS) (Catarci, T., et. al., "Visual Query Systems for Databases: A Survey", Technical Report SI/RR-95/17, Dipartimento di Scienze dell'Informazione, Universita' di Roma "La Sapienza", 1995).

In comparison, relatively little focus has been placed by conventional systems on an interface provided by the tools used to define and manipulate data models and database schemas. Commercial database modeling products such as Rational tools provide visual data modeling profiles that integrate into the broader software development cycle (Gornik, D., "UML Data Modeling Profile", IBM Rational Software Whitepaper TP 162 05/02, 2003). These profiles are generally geared to UML (Unified Modeling Language) modeling of relational databases. The OPOSSUM system, developed at the University of Wisconsin, allows a database schema to be edited through manipulation of the schemas visualization (Haber, E. M., et. al., "OPOSSUM: A Flexible Schema Visualization and Editing Tool," In Proceedings of the 1994 ACM CHI Conference, Boston, Mass., April 1994; and Haber, E. M., et. al. "Opossum: Desk-Top Schema Management through Customizable Visualization," In Proceedings of the $21^{st}$ International VLDB Conference, pages 527-538, Zurich, Switzerland, September 1995).

Document management systems typically encompass some aspect of document understanding and classification to support the business process. The general problem of classifying machine printed documents into genres has been explored where visual layout is a critical factor in recognizing fine-grained genres, since document content features are similar. One conventional method for document management uses layout structure detected from scanned binary images of the document pages, using no optical character recognition (OCR) results but instead using attributed relational graphs (Bagdanov, A. D., et. al., "Fine-Grained Document Genre Classification Using First Order Random Graphs", In Proceedings of ICDAR 01).

Another conventional system utilizes learning techniques on layout based on the "logical closeness" where a directed weight graph is used to represent document layout (Li, X., et. al., "A Document Classification and Extraction System with Learning Ability", In proceedings of ICDAR 99). Yet another conventional system uses document classification based on visual similarity (Hu, J., et. al., "Document Image Layout Comparison and Classification", In Proceedings of ICDAR 99). In this conventional system, interval encoding is introduced to capture elements of spatial layout. These conventional systems propose a Hidden Markov model based page layout classification system that is trainable and extensible based on this spatial feature.

A further conventional system utilizes user-directed "rapid capture" of portions of a scanned image including tools to ease the accessing, editing, and dispatch to a desired destination, such as archive, application, webpage, etc. (Simske, S. J., et. al., "Editing and authoring: User-directed analysis of scanned images", In Proceedings of the 2003 ACM symposium on Document Engineering, 2003). These tools utilize user-directed zoning analysis, known as "click and select", and statistics-based region classification. "Click and select" incorporates a bottom-up zoning analysis engine. Statistics-based region classification allows rapid reconfiguration of region.

Although these conventional technologies have proven to be useful, it would be desirable to present additional improvements. The lifecycle of document management applications typically involves these phases:

a) ingest or capture of content;
b) management (including search, retrieval and workflow);
c) fulfillment at the end of the business process; and
d) archival for compliance or regulatory reasons.

The ingest or capture phase typically creates metadata associated with incoming documents and associates the document with a schema defined in a content management system. The metadata associated with a schema enables the management phase to search the repository effectively in the context of the business process and workflow. After any management or transactions associated with the process have been completed, fulfillment activities may be triggered such as notifications, integrations with other systems like accounting, payables, records etc. If the documents need to be retained for a fixed period of time for audit reasons, they may be archived in offline storage.

Conventional document management systems manage the ingest phase in separate capture subsystems that allow the specification of the metadata in separate environments. Data that the conventional document management system should manage are located in many different places such as different branches of a business, a field office as opposed to a main office, etc. The documents are subsequently "released" into the content management system. Since these capture subsystems are often decoupled from the overall content management system, the metadata extracted is loosely tied to the schema and business process. As a result, there is frequently a manual step associated with the actual assignment of metadata and association with the specific schema or process resulting in reduced efficiencies in the overall context. For example, data that a business requires are typically collected and processed manually, often in a batch. Further, the ingest phase often has no linkage with the fulfillment or triggering of business processes after the management phase.

What is therefore needed is a system, a service, a computer program product, and an associated method for automatically, dynamically, and selectively composing and managing data and documents. The need for such a solution has heretofore remained unsatisfied.

SUMMARY OF THE INVENTION

The present invention satisfies this need, and presents a service and an associated method (collectively referred to herein as "the system" or "the present system") for applying relevant document analysis, metadata extraction, and business process association algorithms to automatically, dynamically, and selectively classify documents for routing, processing, and executing customized business logic.

The present system provides an intelligent document management framework with relevant document analysis, metadata extraction and business process association algorithms and methodology. The present system accepts documents from one or more channels—scanned paper, print stream, and electronic documents from the desktop, classifies the document and extracts metadata, executes customized application profiles and triggers business logic associated with the process.

The present system comprises a metadata prompting module, a metadata extraction module, business processes, a verification module, and an execution module. The metadata prompting module is installed on an input device such as a scanner or printer. As a user is inputting a document into the present system via the input device, the metadata prompting module requests information about the document from the user through one or more prompts. These prompts may take the form of selections, button clicks, text entry, etc. In one embodiment, the metadata prompting module is installed on a server with the metadata extraction module. The metadata extraction module automatically extracts metadata from the document.

The execution module is installed on a gateway. In one embodiment, the execution module is installed on a server with the metadata extraction module. The execution module retrieves the document and associated metadata from the server. The execution module selectively and automatically executes instructions in the business processes as determined for the document and associated metadata.

The business processes comprise instructions executed by the execution module. These instructions are selectively executed on a document-by-document basis determined from a classification of the document. A user can select which of the instructions in the business processes are executed for each document type. Further, a user can modify the selection of instructions while the present system is operating without changing any portion of the execution module, shutting down the present system, or rebooting the present system. The execution module transmits the document and associated metadata to one or more of the output devices as determined from the associated metadata and the business processes.

A conventional content management system constitutes a single framework that tightly links the ingest phase with the management phase and the fulfillment phase using a common infrastructure. In comparison, the present system uses a dynamic and flexible framework that enables cycle times associated with the document management transaction to be significantly reduced, providing overall efficiencies in the process.

Conventional content management systems rely on structured forms with predictable locations of features, often operating on visual features alone. The present system comprises a rules engine in the form of business processes to detect and classify unstructured forms as well as structured forms, where the locations of attributes and visual layout are not fixed. The present system uses document layout as well as textual content within the layout in the rule predicates to detect and classify documents. Document flows managed by the present system are dynamically configurable to an application, beyond what conventional workflow and document management products offer. The present system can scale effectively in terms of dynamic configurability as well as accommodate up to real-world documents such as invoices and shipping bills.

The present system may be embodied in a utility program such as an automatic document management utility program. The present system provides means for a user to identify one or more business processes for the automatic document management utility program and then invoke the automatic document management utility program to receive documents as input, extract metadata from the documents, analyze the metadata of the documents, and classify the documents. The present system provides means for a user to receive a notification that a verification is required for the document and associated metadata. The present system provides means for the user to verify or augment the document and associated metadata. The present system further issues an update to an output device comprising the document, associated metadata, classification of the document, augmented data provided by the user, actions taken by the user, and results of execution of the business processes. The present system further provides means for the user to modify the business processes while the present system is in operation.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 5 is an exemplary business process of the document management system of FIGS. 1 and 2;

DETAILED DESCRIPTION OF PREFERRED EMBODIMENTS

Figure 1:
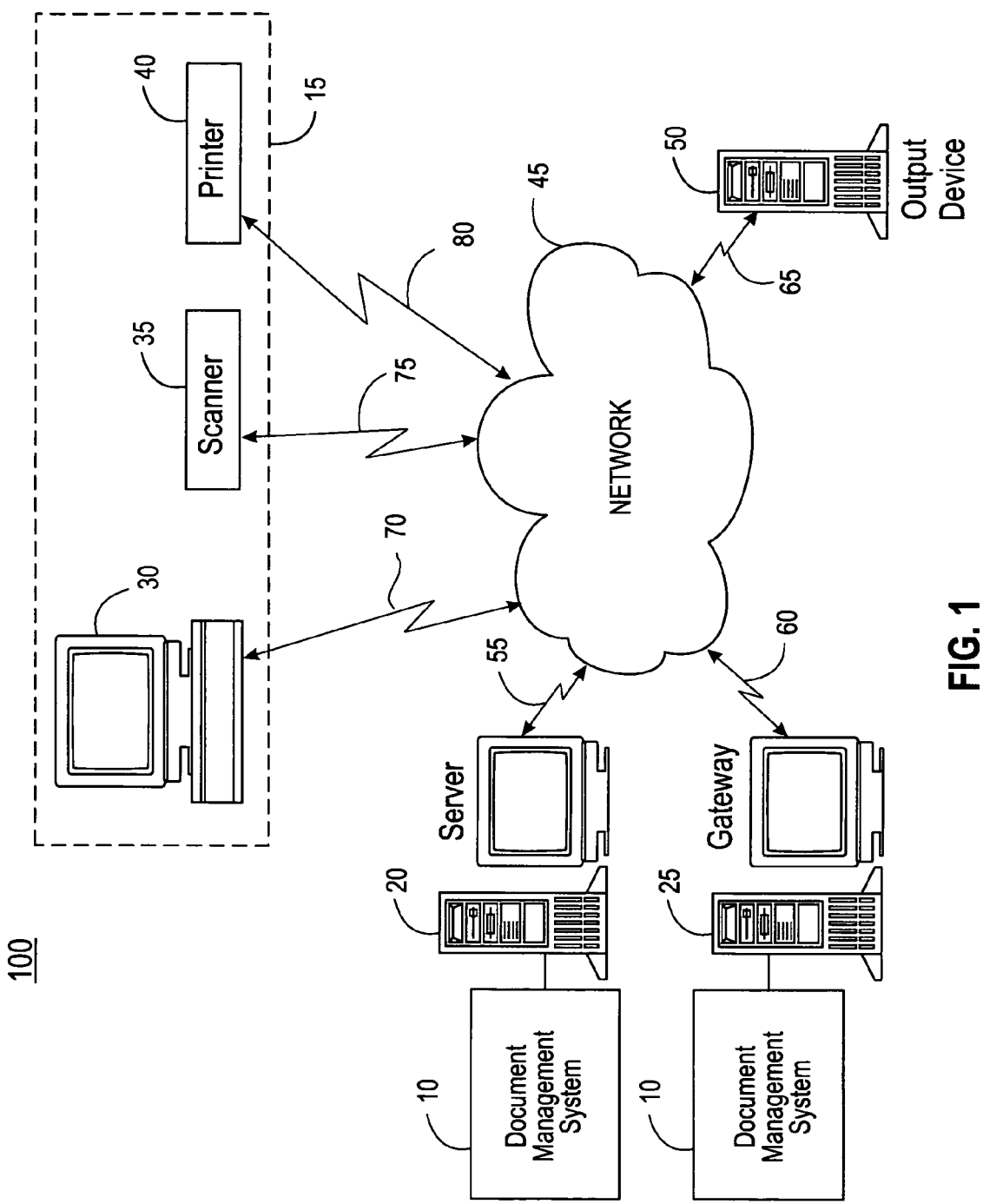
FIG. 1 is a schematic illustration of an exemplary operating environment in which a document management system of the present invention can be used.

FIG. 1 portrays an exemplary overall environment (the "content management system 100") in which a system, service, computer program product, and associated method (the document management system 10, or "system 10") for automatically and dynamically composing document management applications for an e-business hosting service according to the present invention may be used. System 10 comprises a software programming code or a computer program product that is typically embedded within, or installed on input device 15, a server 20, and a gateway 25. Alternatively, system 10 can be saved on a suitable storage medium such as a diskette, a CD, a hard drive, or like devices. While system 10 is referenced in terms of documents, system 10 can be used to manage content of any type or form that can be electronically transmitted, processed, and stored, such as, for example, paper or electronic documents, photographs, video recordings, audio recordings, etc.

The input device 15 is represented by a variety of devices such as, for example, a computer 30, a scanner 35, or a printer 40. The input device 15 is any type of content capture device that can input content to the content management system 100. Users can input documents, images, video, audio, etc. into the content management system 100 by means of the input device 15. The input device 15 can access server 20 through a network 45. Gateway 25 accesses server 20 and an output device 50 through network 45.

The input device 15, server 20, gateway 25, and the output device 50 each comprise software that allows a secure interface over network 45. Server 20, gateway 25, and the output device 50 are each connected to network 45 via a communications link 55, 60, 65, respectively. The communications link 55, 60, 65 comprises links such as a telephone, cable, or satellite link. The input device 15 can be connected to network 45 via communications links such as a telephone, cable, or satellite link. Computer 30, scanner 35, and printer 40 are connected to network 45 via a communications link 70, 75, 80, respectively.

While system 10 is described in terms of network 45, the input device 15, server 20, gateway 25, and output device 50 may also communicate via a local area network, a wide area network, or any other network that allows communication between the input device 15, server 20, gateway 25, and output device 50. Furthermore, any one or more of the input device 15, server 20, gateway 25, or output device 50 may be co-located, communicating over a network such as, for example, a local area network while others of the device 15, server 20, gateway 25, or output device 50 are located remotely, connecting over a network such as, for example, the Internet.

Computer 30 functions as in input device in the content management system 100. Computer 30 may otherwise function as a user interface with the content management system 100. A user may access documents for verification or review from a computer or other device as represented by computer 30.

Figure 2:
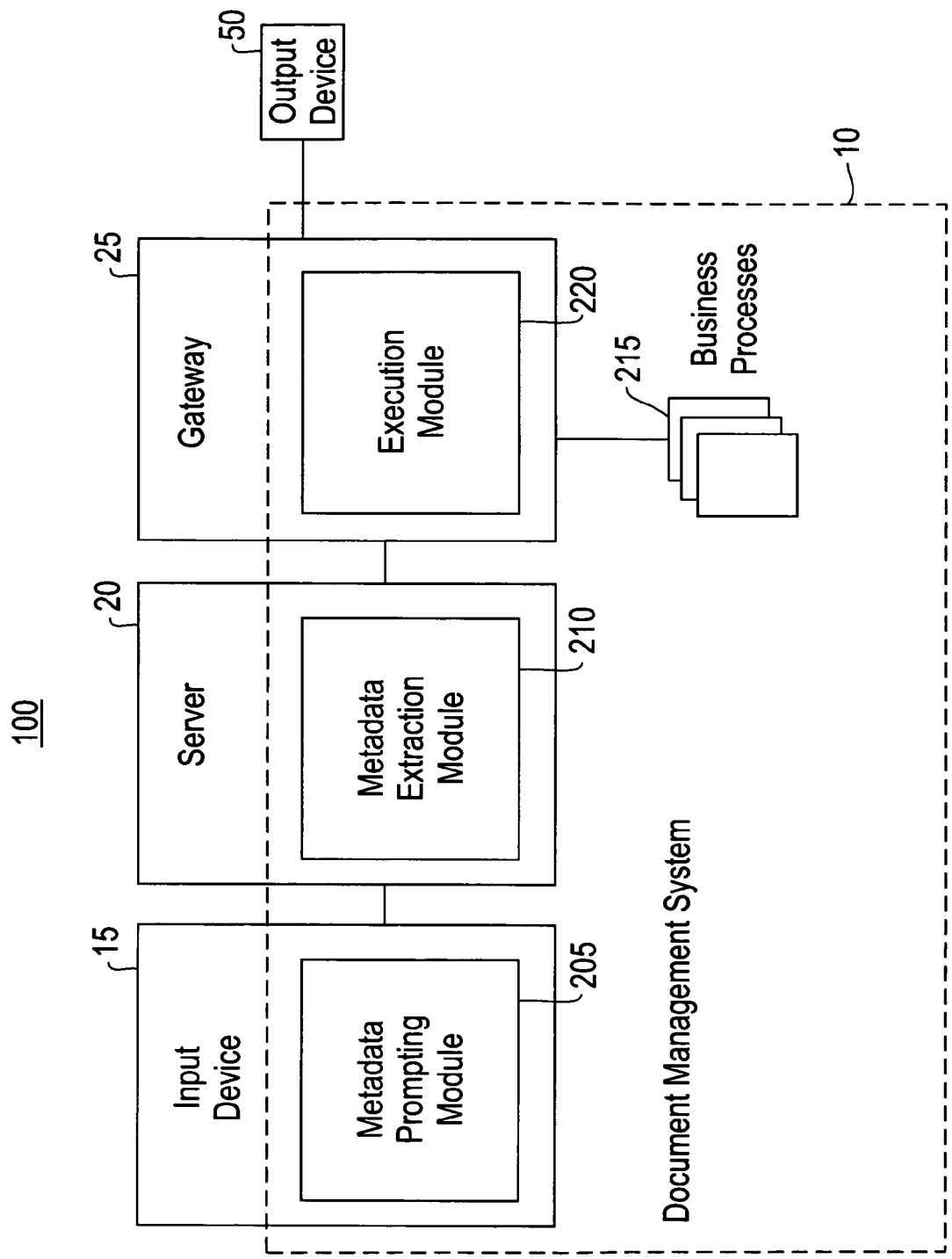
FIG. 2 is a block diagram of the high-level architecture of the document management system of FIG. 1.

FIG. 2 illustrates a high-level hierarchy of system 10. System 10 comprises a metadata prompting module 205, a metadata extraction module 210, business processes 215, and an execution module 220. The metadata prompting module 205 is installed on the input device 15. As a user is inputting a document into the content management system 100 via the input device 15, the metadata prompting module 205 requests information about the document from the user through one or more prompts. These prompts may take the form of text, audio, video, etc. In one embodiment, the metadata prompting module 205 is installed on server 20.

The metadata extraction module 210 is installed on server 20. The metadata extraction module 210 automatically extracts metadata from the document. The execution module 220 is installed on gateway 25. The business processes 215, also installed on gateway 25, comprise instructions executed by the execution module 220. The execution module 220 retrieves the document and associated metadata from server 20. The execution module 220 analyzes the document and associated metadata to determine the document type and classify the document. The execution module 220 then selectively and automatically executes instructions in the business processes 215 on a document-by-document basis as determined by the document type and classification of the document.

A user can select which of the instructions in the business processes 215 are executed for each document type. Further, a user can modify the selection of instructions while system 10 is operating without changing any portion of the execution module 220, shutting down system 10, or rebooting system 10. The execution module 220 issues an external system update to the output device 50 to integrate the document, associated metadata, and output of the execution module 220 with the output device 50. The external system update comprises a create, an update, a delete, or a query. While the output device 50 is referenced as one device for illustration purpose only, it should be clear that system 10 is applicable as well to, for example, additional devices operating as output device 50. Furthermore, the additional devices and the output device 50 may operate a variety of different applications such as, for example, a database, a data repository, a content management system, etc.

Figure 3:
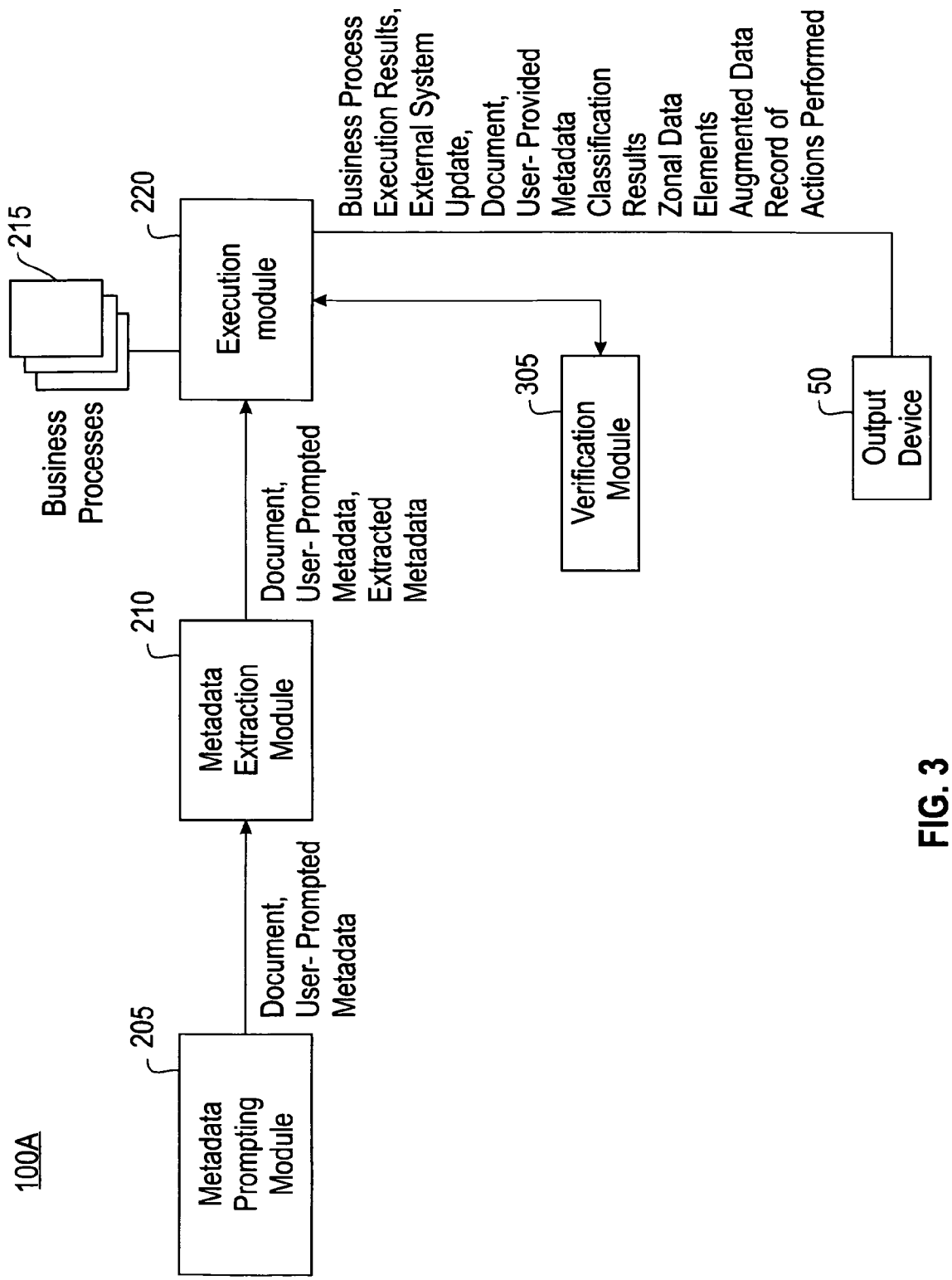
FIG. 3 is a block diagram of the document management system of FIGS. 1 and 2 illustrating document and metadata flow in the present invention.
Figure 4A:
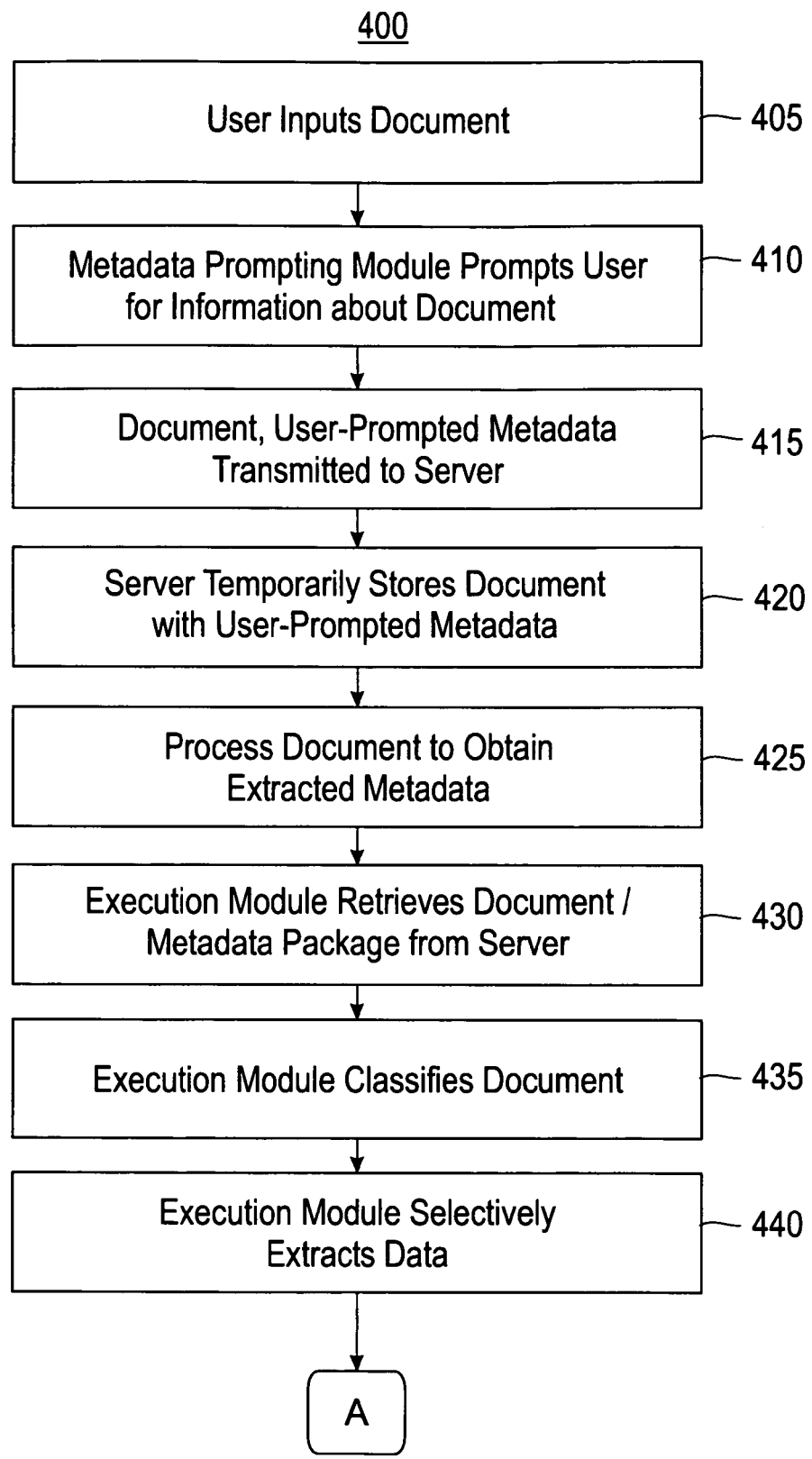
FIG. 4 is a process flow chart illustrating a method of operation of the document management system of FIGS. 1 and 2.

FIG. 3 illustrates in more detail an instance of the content management system 100A. FIG. 4 (FIGS. 4A, 4B) illustrates a method 400 of operation of system 10 in the content management system 100A. In operation, and with further reference to FIGS. 3 and 4, a user inputs a document via the input device 15 by, for example, scanning a document, printing a document directly through a print driver, etc. (step 405). The metadata prompting module 205 prompts the user for information about the document (step 410). The metadata prompting module 205 allows system 10 to interface with the user and request information about the user that is associated with the document such as, for example, user name, user ID, or user comments. The metadata prompting module 205 further allows system 10 to interface with the user and request information about the document that may not be discernable from the document. The information about the user and information about the document provided by the user is referenced as user-prompted input.

For example, in the case of an invoice, the metadata prompting module 205 can request the transaction date, the merchant, etc. In the case of an insurance claim, the metadata prompting module 205 can request the policy number, client, etc. The metadata prompting module 205 detects a document type for the document being entered and tailors the prompts presented to the user according to the type of document. The metadata prompting module 205 generally prompts the user for information about the document that is not provided on the document. In the example of a content management system 100A for an insurance company, prompts are different for the various types of documents generated such as, for example, an invoice, a claim, an estimate, a damage photograph, a video of a deposition, an audio interview, a bid for repair, etc. Outputs of the metadata prompting module 205 are the document and the user-prompted input.

The document and the user-prompted input associated with the document are transmitted to server 20 and the metadata extraction module 210 (step 415). Server 20 temporarily stores the document and the user-prompted input (step 420). The metadata extraction module 210 processes the document to obtain extracted metadata (step 425); i.e., data about the document that is found by automatically extracting metadata from the document. Any method for automatically extracting metadata from the document may be used such as, for example, optical character recognition (OCR), logical OCR, named entity extraction, etc. The document, the user-prompted input, and the extracted metadata are collectively referenced as a document/metadata package.

The execution module 220 retrieves the document/metadata package from server 20 (step 430). The execution module 220 selectively and automatically executes instructions in the business processes 215. The execution module 220 automatically classifies the document based on the user-prompted input or the extracted metadata (step 435). The execution module 220 automatically determines that the document is, for example, an invoice, evidence in an insurance claim, an application form, etc. Based on the document classification, the execution module 220 selectively extracts key data fields from relevant sections in the document (step 440). For example, the execution module 220 can extract a transaction number, a document ID number, etc. from known locations within the document based on document classification. The results of this selective extraction are referenced as zonal data elements. The business processes 215 specify the key data fields and their locations in the document.

Specific extractions performed by the execution module 220 are determined from the business processes 215. For each document classification, the business processes 215 specify classification requirements, data to be extracted, OCR requirements, etc. As directed by the business processes 215, the execution module 220 may selectively OCR only specified zones in the document, referenced herein as zonal OCR. For example, as applied to an insurance claim process, zonal OCR may extract information pertinent to a claim rather than the address of the claimant.

As directed by the business processes 215, the execution module 220 sends a notification to a user that the document/metadata package along with zonal data elements requires verification (step 445). This notification can be provided by any available means such as, for example, mail, e-mail, instant message, voice mail, cell phone, wireless, telephone, or any other mechanism in place for notifying the proper person for verification of the document. The execution module 220 may determine the notification recipient from the classification of the document. For example, one person may be notified to verify insurance claims while another person may be notified to verify invoices. The business processes 215 provide direction of the verification notice to a particular person or organization.

The execution module 220 outputs to a verification module 305 the document/metadata package, zonal data elements, and classification results as specified by the business processes 215. User verification (step 450) comprises reviewing and correcting data, augmenting data, and performing any actions required. In one embodiment, the user is presented with verification pages via a verification interface such as, for example, a web-based verification interface. The execution module 220 generates one or more customized verification pages "on the fly" from information provided in the user-prompted input and the extracted metadata and from instructions provided by the business processes 215.

The user reviews the user-prompted input, the extracted metadata, and zonal data elements for OCR or typographical errors. The user can review the classification of the document for accuracy. The user can further augment the data as necessary. In addition, the user can perform any actions required by the arrival of the document such as, for example, paying an invoice. After review and revision, the verification module returns to the execution module the verified document/metadata package, verified zonal data elements, verified classification results, any augmented data, and record of any actions performed by the user.

Results obtained by the verification module 305 are returned to the execution module 220 (step 455). The execution module 220 selectively and automatically executes any additional instructions from the business processes 215 (step 460). The execution module 220 associates the document/metadata package with an output device 50 (step 465). The output device may be a database, a content management system, a content repository, etc. The execution module 220 outputs to the output device the document/metadata package, zonal data elements, augmented data, execution results of the business processes 215, record of any actions performed by the user, and any required external system update (step 470). Output of the execution module 220 further comprises external system integration with the output device such as create, update, delete, and query.

The execution module 220 processes the document/metadata package according to the business processes 215 associated with the information in the user-prompted input and the extracted metadata. In one embodiment, the business processes 215 are stored in a structured or semi-structured representation such as, for example, extensible markup language (XML), business process execution language for web services (BPEL), etc. The business processes 215 customize the system 10 to a particular business deployment and a specific business process. The business processes 215 are dynamically adaptable; the logical business process codified in the business processes 215 can be changed simply by changing a file such as, for example, an XML file, without changing any other portion of system 10, installing new software, rebooting the content management system 100A, or otherwise interrupting the operation of the content management system 100A.

An exemplary illustration of the business processes 215 is shown in FIG. 5 as an XML document 500. While the business processes 215 are described for illustration purposes only in relation to XML, it should be clear that system 10 is applicable as well to, for example, any structured or semi-structured programming language. The business processes 215 comprise a classification specification 505, a zonal OCR specification 510, and a notification specification 515. Additional specifications can be added as needed to the business processes 215.

A usage specification 520 can be set on (as shown in FIG. 5) or off (<USAGE>Off</USAGE>) for each of the components of the business processes 215. As illustrated in FIG. 5, the usage specification 520 is set "on" for the classification specification 505, the zonal OCR specification 510, and the notification specification 515. The usage specification 520 for any one or more of the classification specification 505, the zonal OCR specification 510, and the notification specification 515 can be changed at any time during operation of the content management system 100.

The classification specification 505 and the zonal OCR specification 510 further comprise a verification specification 525. The verification specification 525 specifies human verification of the automatic processing of a document. The verification specification 525 can be specified for the classification specification 505 or the zonal OCR specification 510. The verification specification 525 can be set on (as shown in FIG. 5) or off (<VERIFICATION>Off</VERIFICATION>). The verification specification 525 for any one or more of the classification specification 505 and the zonal OCR specification 510 can be changed at any time during operation of the content management system 100.

The notification specification 515 comprises a notification interface specification 530, a notification contact specification 535, and a notification text 540. While shown in FIG. 5 as an e-mail notification, the notification interface specification 530 can be made for other forms of notification such as, for example, mail, instant messaging, voice messaging such as cell phone, wireless, telephone, etc. Any one or more of the form of notification specified by the notification interface specification 530, the notification contact specification 535, and the notification text 540 can be changed at any time during operation of the content management system 100.

Figure 6:
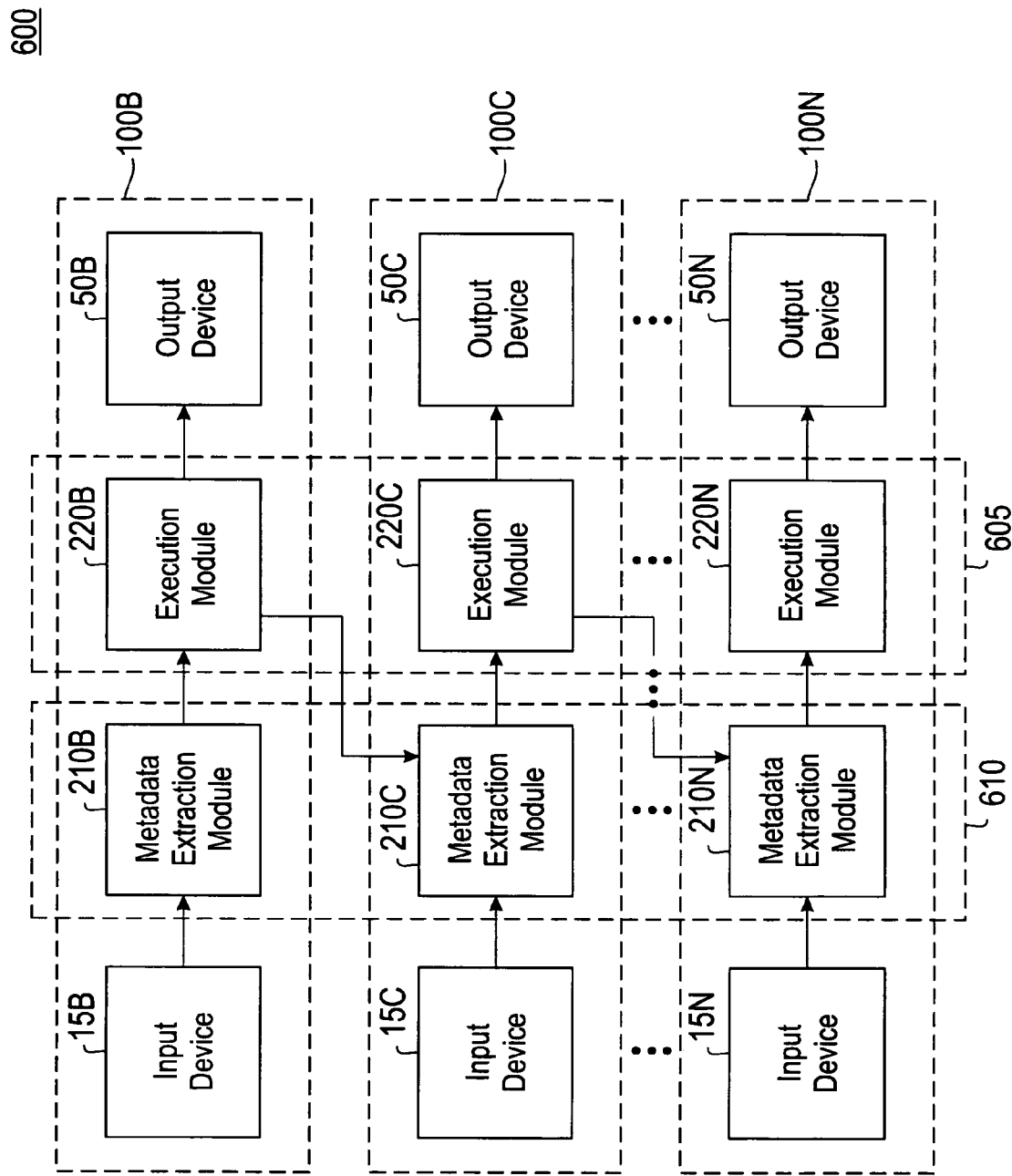
FIG. 6 is a block diagram illustrating the serial connection properties of the document management system of FIGS. 1 and 2.

FIG. 6 illustrates one embodiment in which additional versions of the content management system 100 perform as nodes in a serial content management system 600. A content management system 100B comprises an input device 15B with a metadata prompting module 205 (not shown), a metadata extraction module 210B, an execution module 220B, and an output device 50B. Similarly, a content management system 100C comprises an input device 15C with a metadata prompting module 205 (not shown), a metadata extraction module 210C, an execution module 220C, and an output device 50C. Additional versions of the content management system 100 may be added, as illustrated by content management system 100N. Content management system 100N comprises an input device 15N with a metadata prompting module 205 (not shown), a metadata extraction module 210N, an execution module 220N, and an output device 50N.

Each of the content management system 100B, the content management system 100C, through the content management system 100N perform as nodes in a workflow. Output from the execution module 220B is sent to the output device 50B of the content management system 100B and to the metadata extraction module 210C of the content management system 100C. In a similar manner, output of each of the execution modules 605 is sent to the next of the metadata extraction modules 610 in an overall workflow of the serial content management system 600.

For example, the serial content management system 600 may represent workflow for a patent application development process of an invention. The content management system 100B represents a patent disclosure node. The content management system 100C represents a patent review node. The content management system 100N represents a patent-application filing node. The input device 15B represents many input devices collecting information from inventors from all over the world in a large company. The input device 15B comprises computers used by the inventors, scanners, printers, laboratory equipment, or any other device that captures information that may be used in the patent application development process. Information from the input device 15B is sent to the metadata extraction module 210B and the execution module 220B for processing as described previously. Output from the execution module is verified as described previously, and stored in output device 50B.

Selected output from the execution module 220B is automatically input to the metadata extraction module 210C by the execution module 220B and added to the information flow for the patent review node. Further information required by the patent review node is collected by the input device 15C.

The verification process of the patent review node comprises approval by managers and peers of the invention for patent application.

Selective output from the execution module 220C is automatically input to the metadata extraction module 210N and added to the information flow for the patent-application filing node. Input to the metadata extraction module 210N comprises selected documents and information from the patent review node, input from patent attorneys, patent application writers, draftspersons, additional input from inventors, etc. Output from the execution module 50N comprises the patent application and application documentation.

Figure 7:
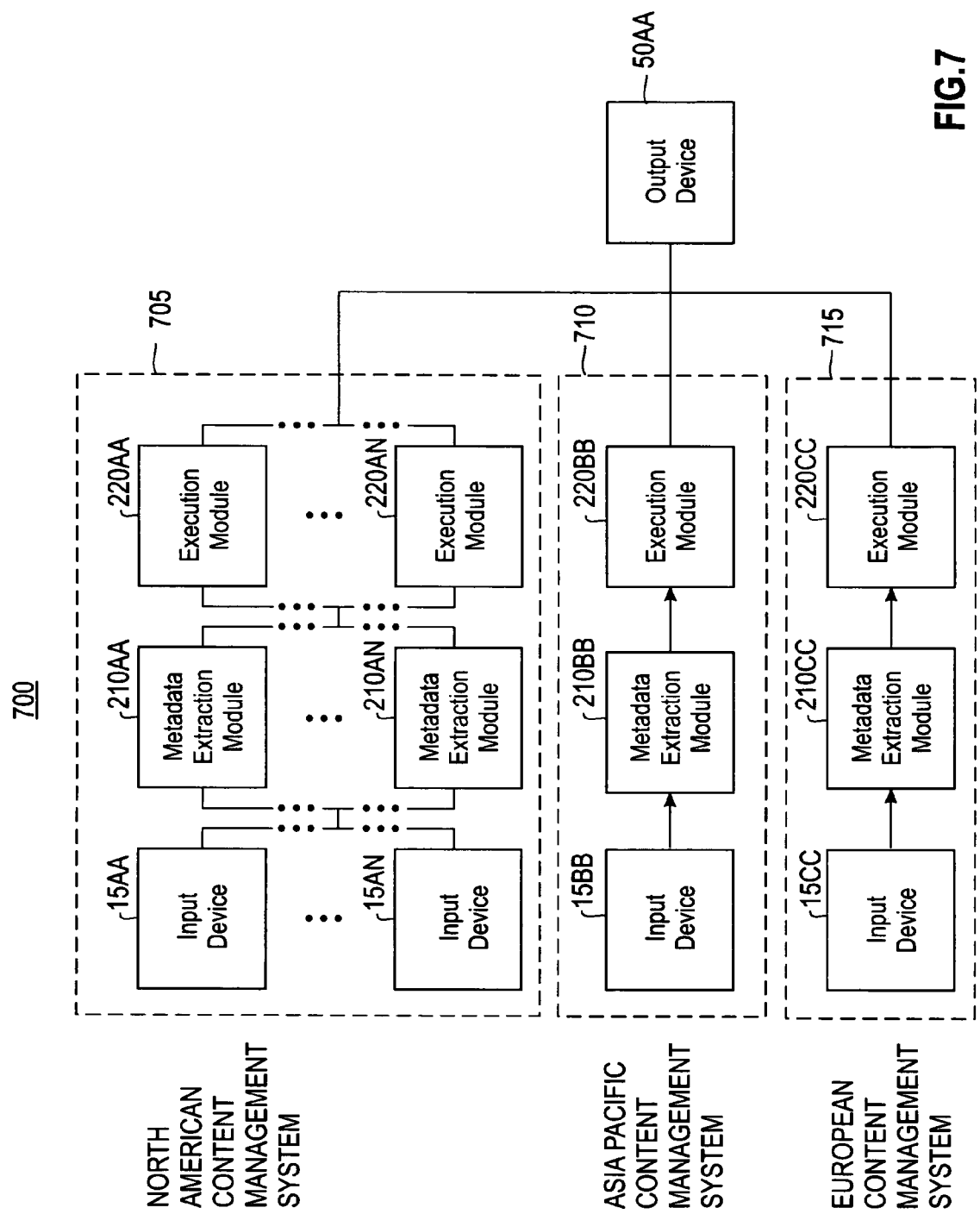
FIG. 7 is a block diagram illustrating the scalability and distributed nature of the document management system of FIGS. 1 and 2.

FIG. 7 shows a distributed content management system 700 illustrating the distributed capability of system 10 and further illustrating the scalability of system 10. For example, a company may comprise a North American division, an Asia-Pacific division, and a European division. The North American division comprises a North American content management system 705. The Asia-Pacific division comprises an Asia-Pacific content management system 710. The European division comprises a European content management system 715.

The North American content management system 705 comprises one or more input devices such as the input device 15AA through the input device 15AN, one or more metadata extraction modules such as the metadata extraction module 210AA through the metadata extraction module 210AN, and one or more of execution modules such as the execution module 220AA through the execution module 220AN. Any one or more of the input device 15AA through the input device 15AN, the metadata extraction module 210AA through the metadata extraction module 210AN, or the execution module 220AA through the execution module 220AN may reside in the same room, in the same building, or in different locations throughout North America. Furthermore, as many units as needed of the input device 15AA through the input device 15AN, the metadata extraction module 210AA through the metadata extraction module 210AN, or the execution module 220AA through the execution module 220AN may be incorporated in the North American content management system 705 to adequately manage the flow of documents.

The Asia-Pacific content management system 710 comprises the input device 15BB, the metadata extraction module 210BB, and the execution module 220BB. Any one or more of the input device 15BB, the metadata extraction module 210BB, or the execution module 220BB may reside in the same room, in the same building, or in different locations throughout Asia-Pacific. While one each of the input device 15BB, the metadata extraction module 210BB, and the execution module 220BB are illustrated in FIG. 7, as many devices as needed of the input device 15BB, the metadata extraction module 210BB, and the execution module 220BB may be incorporated in the Asia-Pacific content management system 710 to adequately manage the flow of documents.

The European content management system 715 comprises the input device 15CC, the metadata extraction module 210CC, and the execution module 220CC. Any one or more of the input device 15CC, the metadata extraction module 210CC, or the execution module 220CC may reside in the same room, in the same building, or in different locations throughout Europe. While one each of the input device 15CC, the metadata extraction module 210CC, and the execution module 220CC are illustrated in FIG. 7, as many devices as needed of the input device 15CC, the metadata extraction module 210CC, and the execution module 220CC may be incorporated in the European content management system 715 to adequately manage the flow of documents.

As illustrated in FIG. 7, output of the North American content management system 705, the Asia-Pacific content management system 710, and the European content management system 715 are transmitted to an output device 50AA. The output device 50AA may be located in North America, Asia-Pacific, Europe, or any other location. Consequently, the content management system 100 utilizing the system 10 can manage document flow world wide either serially (FIG. 6) or distributed (FIG. 7), or a in a manner combining serial and distributed features. For example, the Asia-Pacific content management system 710 may be replaced by a serial content management system 600, with the function of the output device 50N replaced by output device 50AA.

An example of an application in which the content management system can be used is in credit card dispute management. For example, a customer relationship management company deals with disputes arising between customers and merchants on credit card charges. The dispute process flow for a conventional content management system for credit card dispute management is typically as follows:

1. A customer calls a customer service representative (CSR) and receives a unique case ID and customer dispute form;

2. A dispute management system receives merchant dispute documents and automatically stores the merchant dispute documents in a conventional document management system;

3. The customer mails the dispute form and supporting documents back to the customer relationship management company using a variety of input channels such as, for example, mail, email, or fax;

4. A mailroom worker scans the customer document; the customer document sits in a staging area until the customer service representative reviews the customer document and associates the customer document with a dispute record; and 5. The customer also e-mails a receipt supporting the dispute; this e-mail requires review by the customer service representative before the e-mail can be associated with the dispute record.

Using the conventional content management system for credit card dispute management, there could be a delay of up to one week between the steps 3 and 4 when the customer has sent in the dispute documents and until the customer service representative evaluates the dispute folder. The manual steps associated with linking the customer documents with the dispute folder by different personnel involved in the dispute process cause this delay.

Using the content management system 100 and system 10, the streamlined process from step 3 above is as follows:

1. Mailroom worker uses an input device 15 to scan a customer document and enters a case ID in response to a prompt from the metadata prompting module 205. System 10 automatically associates the customer document with the dispute record.

2. On receipt of an e-mail from the customer, the customer service representative inserts the e-mail into the correct dispute record directly from the e-mail application by entering the case ID in response to prompts from the metadata prompting module 205.

3. The execution module 220 automatically moves the dispute record from a "Suspend" state into a "Ready" state for review (i.e., verification) by a dispute officer. The streamlined business process provided by the content management system 100 and system 10 results in reducing the dispute resolution time from approximately one week to approximately two days, resulting in a compelling business value for the customer.

Another example of an application in which the content management system 100 and system 10 may be used is managing parking tickets. A process by which a large city manages parking tickets comprises data centers, call centers, a payment system, and payment applications. One of the larger cities in the United States processes nearly 3 million handwritten tickets annually.

Currently, the parking tickets are managed by nightly collection of paper documents from branch offices (approximately 30 branch offices across the city) averaging 10,000 tickets per location. At a central location, the documents are batch imaged using high volume scanners with two scan operators and ten verifiers dedicated to the task of verifying the documents after scanning. This process takes three business days before an electronic record of the ticket can be established; and therefore ticket entry and verification is a gating factor for any business process or calls related to the ticket.

The content management system 100 and system 10 creates an electronic record of the 10,000 tickets per branch location within one business day of the ticketed incident. System 10 also supports a distributed verification of the ticket and associated data such that a record of the ticket can trigger business processes 215 related to the ticket within two business days. Overall, in the process lifecycle, great efficiencies are achieved with the use of the content management system 100 and system 10.

It is to be understood that the specific embodiments of the invention that have been described are merely illustrative of certain applications of the principle of the present invention. Numerous modifications may be made to the system, method, service for automatically and dynamically composing document management applications for an e-business hosting service described herein without departing from the spirit and scope of the present invention. While the present invention is referenced in terms of documents, it should be clear that the invention is applicable as well to, for example, content of any type or form that can be electronically transmitted, processed, or stored, such as, for example, paper or electronic documents, photographs, video recordings, audio recordings, etc.

What is claimed is:

1. A method for a content management system, the method comprising:

automatically detecting a document type for a document based on content of said document;

tailoring prompts according to said detected document type, and through said tailored prompts, receiving information about said document, said received information comprising a user-prompted input;

automatically extracting metadata from said document, wherein said document, said user-prompted input, and said extracted metadata collectively comprise a document/metadata package; and executing a plurality of instructions for a business process, said instructions comprising:

a) analyzing said document/metadata package, document layout, and content within said layout to generate a document classification;

b) based on said document classification, selectively extracting key data fields from their respective locations within said document, said extracted key data fields comprising zonal data elements;

c) sending a notification to a notification recipient that said document/metadata package and said zonal data elements requires a verification, said verification comprising at least one of reviewing, correcting, augmenting, and performing actions required by said document;

d) based on said verification, selectively and automatically executing any additional instructions for said document; and transmitting said document/metadata package and said zonal data elements with an output device as determined from said extracted metadata and said business processes.

2. The method of claim 1, wherein said tailored prompt comprises any one of text, audio, and video.

3. The method of claim 1, wherein said business process instructions further specifying at least one of a classification requirement, an OCR requirement, and a zone within said document.

4. The method of claim 1, further comprising transmitting to said output device at least one of: any of said corrections, any of said augmentations, and a record of any of said required actions performed.

5. The method of claim 1, further comprising repeating (a)-(d) until said verification step produces no further additional instructions to be executed for said document.

6. The method of claim 1, wherein said notification being provided to said notification recipient by any one of mail, e-mail, instant message, voice mail, cell phone, wireless, or telephone.

7. The method of claim 1, further comprising generating customized verification pages on-the-fly from information provided in any one of said user-prompted input, said extracted metadata, and from said business process instructions.

* * * * *